United States Patent
Lai

(10) Patent No.: US 10,007,088 B2
(45) Date of Patent: Jun. 26, 2018

(54) OPTICAL LENS SYSTEM WITH A WIDE FIELD OF VIEW

(71) Applicant: NEWMAX TECHNOLOGY CO., LTD., Taichung (TW)

(72) Inventor: Shu-Tzu Lai, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 244 days.

(21) Appl. No.: 14/298,910

(22) Filed: Jun. 7, 2014

(65) Prior Publication Data

US 2015/0355433 A1    Dec. 10, 2015

(51) Int. Cl.
*G02B 3/02*    (2006.01)
*G02B 13/18*   (2006.01)
*G02B 13/00*   (2006.01)
*G02B 9/34*    (2006.01)

(52) U.S. Cl.
CPC ............ *G02B 13/004* (2013.01); *G02B 9/34* (2013.01)

(58) Field of Classification Search
CPC ...... G02B 13/004; G02B 9/34; G02B 15/173; G02B 15/28; G02B 13/18
USPC ............... 359/644, 686, 713, 715, 734, 740, 359/749–753, 766, 771–773
See application file for complete search history.

(56) References Cited

U.S. PATENT DOCUMENTS

| | | | | |
|---|---|---|---|---|
| 7,777,972 B1* | 8/2010 | Chen | ............ | G02B 13/04 359/715 |
| 8,351,136 B2* | 1/2013 | Tsai | ............ | G02B 13/004 359/715 |
| 8,804,252 B2* | 8/2014 | Hsieh | ............ | G02B 9/34 359/708 |
| 2009/0207507 A1* | 8/2009 | Shinohara | ............ | G02B 9/34 359/773 |
| 2012/0033124 A1* | 2/2012 | Tsai | ............ | G02B 13/18 348/335 |

* cited by examiner

*Primary Examiner* — Mustak Choudhury
(74) *Attorney, Agent, or Firm* — Bruce Stone LLP; Joseph Bruce

(57) ABSTRACT

An optical lens system with a wide field of view includes, in order from the object side to the image side: a stop; a first lens element with a positive refractive power having a convex image-side surface and at least one aspheric surface; a second lens element with a negative refractive power having a concave image-side surface and at least one aspheric surface; a third lens element with a positive refractive power having a concave object-side surface and at least one aspheric surface; and a fourth lens element with a negative refractive power having a convex object-side surface and at least one aspheric surface, at least one of the object-side and the image-side surfaces of the fourth lens element is formed with an inflection point.

6 Claims, 10 Drawing Sheets

OPTICAL LENS SYSTEM WITH A WIDE FIELD OF VIEW

BACKGROUND OF THE INVENTION

Field of the Invention

The present invention relates to an optical lens system, and more particularly to a miniaturized optical lens system with a wide field of view.

Description of the Prior Art

In recent years, with the popularity of electronic products with the function of taking photographs, there's an increasing demand for an optical lens system. In order to obtain a wider shooting range, the lens angle should meet certain requirements. The field of view of the lens is usually designed to be 50 to 60 degrees, if over the above design angle, the aberration is larger and the lens design is more complex.

Therefore, how to develop a miniaturized optical lens system with a wide field of view which not only can be applied to lenses of the electronic products, such as, digital camera, Webcam, mobile phone and so on, but also can reduce the aberration and the design complexity is the motivation of the present invention.

The present invention mitigates and/or obviates the aforementioned disadvantages.

SUMMARY OF THE INVENTION

The primary objective of the present invention is to provide an optical lens system with a wide field of view which can improve the field of view and reduce the aberration.

An optical lens system with a wide field of view in accordance with the present invention comprises, in order from the object side to the image side: a stop, a first lens element with a positive refractive power having a convex image-side, at least one of an object-side and the image-side surfaces of the first lens element being aspheric; a second lens element with a negative refractive power having a concave image-side surface, at least one of an object-side and the image-side surfaces of the second lens element being aspheric; a third lens element with a positive refractive power having a concave object-side surface, at least one of the object-side and an image-side surfaces of the third lens element being aspheric; and a fourth lens element with a negative refractive power having a convex object-side surface, at least one of the object-side and an image-side surfaces of the fourth lens element being aspheric, at least one of the object-side and the image-side surfaces of the fourth lens element being formed with an inflection point.

Preferably, the focal length of the first lens element is f1, the focal length of the second lens element is f2, and they satisfy the relation: $-0.8<f1/f2<-0.4$, so that the refractive power of the first lens element and the second lens element are more suitable, it will be favorable to obtain a wide field of view and avoid the excessive increase of aberration of the system.

Preferably, the focal length of the second lens element is f2, the focal length of the third lens element is f3, and they satisfy the relation: $-3.5<f2/f3<-1.2$, so that the refractive power of the second lens element and the third lens element are more balanced, it will be favorable to correct the aberration of the system and reduce the sensitivity of the system.

Preferably, the focal length of the third lens element is f3, the focal length of the fourth lens element is f4, and they satisfy the relation: $-1.2<f3/f4<-0.5$, so that it will be favorable to form a positive and negative telephoto structure, so as to reduce the total track length of the optical lens system effectively.

Preferably, the focal length of the first lens element is f1, the focal length of the third lens element is f3, and they satisfy the relation: $0.8<f1/f3<2.0$, so that the positive refractive power of the first lens element can be distributed effectively, so as to reduce the sensitivity of the optical lens system with a wide field of view.

Preferably, the focal length of the second lens element is f2, the focal length of the fourth lens element is f4, and they satisfy the relation: $1.0<f2/f4<3.5$, so that the negative refractive power of the system is more suitable, it will be favorable to correct the aberration of the system and improve the image quality of the system.

Preferably, the focal length of the first lens element is f1, the focal length of the second lens element and the third lens element combined is f23, and they satisfy the relation: $0.5<f1/f23<1.8$, so that a wide field of view can be provided and the resolution can be improved evidently.

Preferably, the focal length of the second lens element and the third lens element combined is f23, the focal length of the fourth lens element is f4, and they satisfy the relation: $-1.7<f23/f4<-0.7$, so that a wide field of view can be provided and the resolution can be improved evidently.

Preferably, the focal length of the first lens element and the second lens element combined is f12, the focal length of the third lens element and the fourth lens element combined is f34, and they satisfy the relation: $0.1<f12/f34<1.0$, it will be favorable to obtain a wide field of view and correct the curvature of field effectively.

Preferably, the focal length of the optical lens system with a wide field of view is f, the distance from the object-side surface of the first lens element to the image plane along the optical axis is TL, and they satisfy the relation: $0.5<f/TL<0.85$, it will be favorable to obtain a wide field of view and maintain the objective of miniaturization of the optical lens system with a wide field of view, which can be used in thin electronic products.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
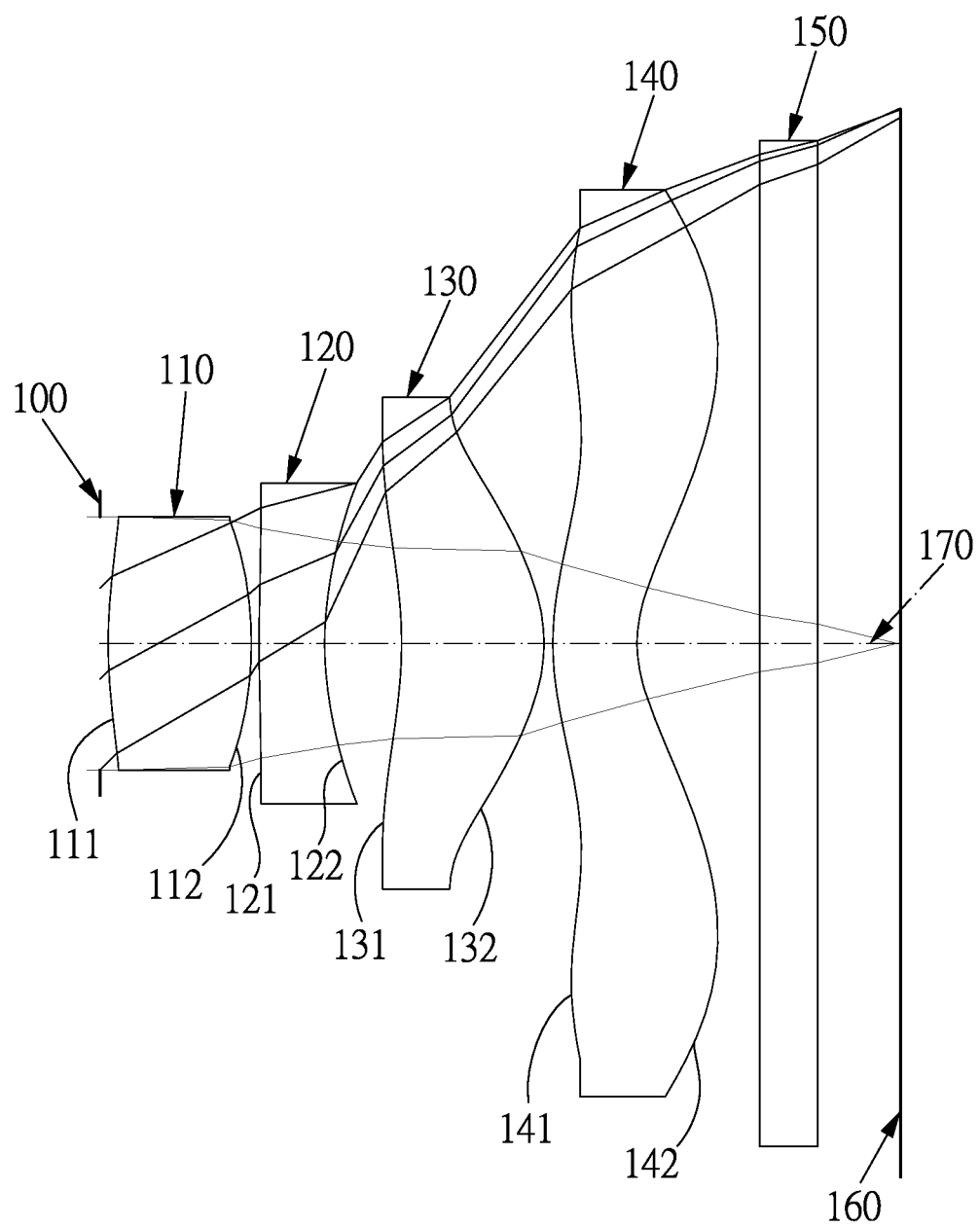
FIG. 1A shows an optical lens system with a wide field of view in accordance with a first embodiment of the present invention.
Figure 1B:
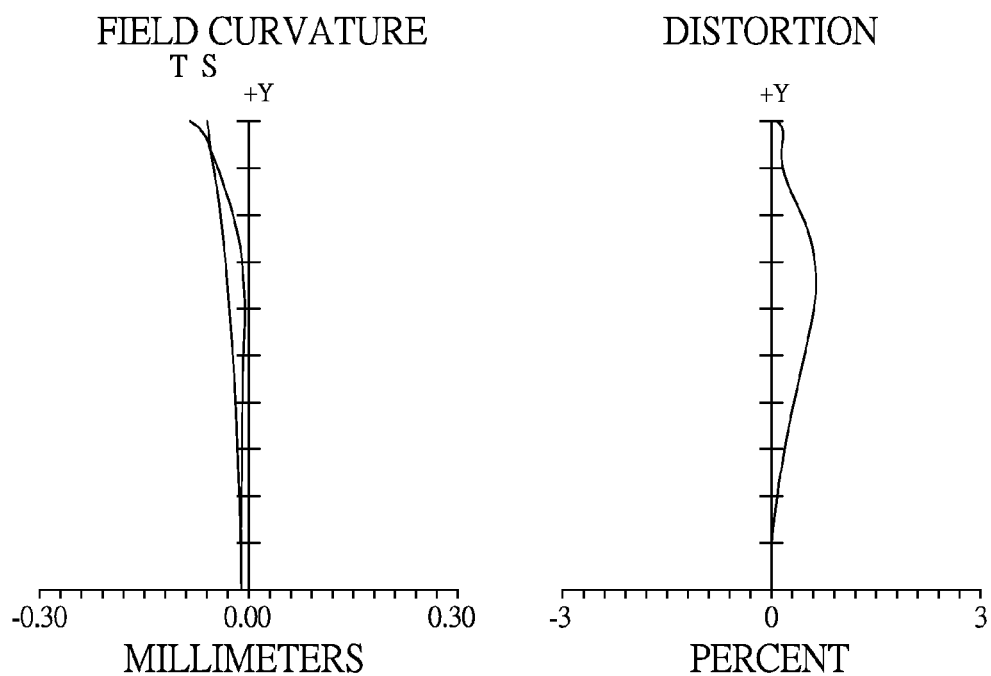
FIG. 1B shows the longitudinal spherical aberration curve, the astigmatic field curve and the distortion curve of the first embodiment of the present invention.
Figure 1B:
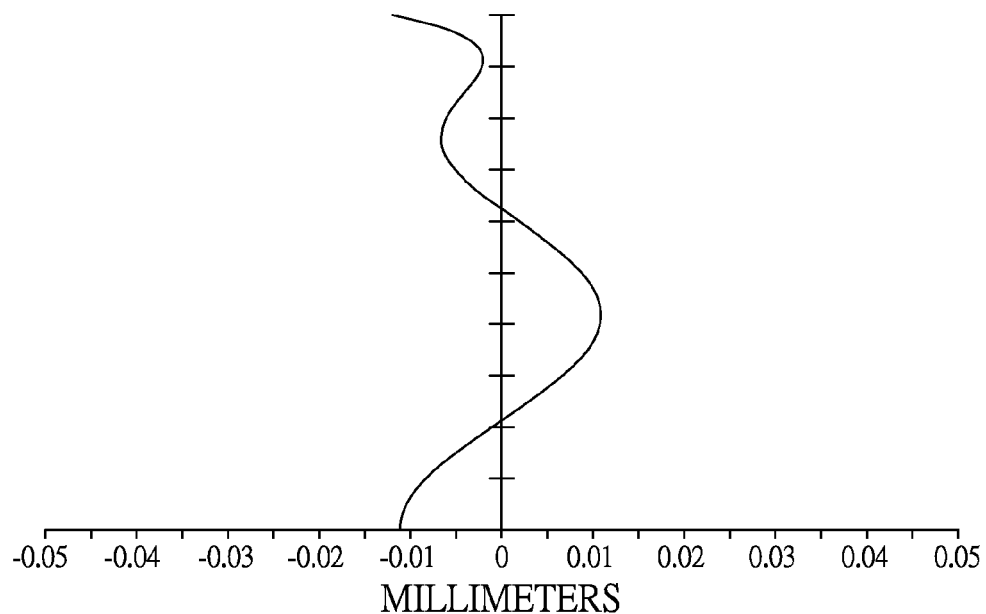

FIG. 1A shows an optical lens system with a wide field of view in accordance with a first embodiment of the present invention, and FIG. 1B shows, in order from left to right, the longitudinal spherical aberration curves, the astigmatic field curves, and the distortion curve of the first embodiment of the present invention. An optical lens system with a wide field of view in accordance with the first embodiment of the present invention comprises, in order from the object side to the image side: a stop 100, a first lens element 110, a second lens element 120, a third lens element 130 and a fourth lens element 140.

The first lens element 110 with a positive refractive power has an object-side surface 111 being convex near an optical axis 170 and an image-side surface 112 being convex near the optical axis 170, the object-side surface 111 and the image-side surface 112 are aspheric, and the first lens element 110 is made of plastic material.

The second lens element 120 with a negative refractive power has an object-side surface 121 being convex near the optical axis 170 and an image-side surface 122 being concave near the optical axis 170, the object-side surface 121 and the image-side surface 122 are aspheric, and the second lens element 120 is made of plastic material.

The third lens element 130 with a positive refractive power has an object-side surface 131 being concave near the optical axis 170 and an image-side surface 132 being convex near the optical axis 170, the object-side surface 131 and the image-side surface 132 are aspheric, and the third lens element 130 is made of plastic material.

The fourth lens element 140 with a negative refractive power has an object-side surface 141 being convex near the optical axis 170 and an image-side surface 142 being concave near the optical axis 170, the object-side surface 141 and the image-side surface 142 are aspheric, and the fourth lens element 140 is made of plastic material.

An IR cut filter 150 made of glass is located between the fourth lens element 140 and an image plane 160 and has no influence on the focal length of the optical lens system with a wide field of view.

The equation for the aspheric surface profiles of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 170;

c represents a paraxial curvature equal to 1/R (R: a paraxial radius of curvature);

h represents a vertical distance from the point on the curve of the aspheric surface to the optical axis 170;

k represents the conic constant;

A, B, C, D, E, G, . . . represent the high-order aspheric coefficients.

In the first embodiment of the present optical lens system with a wide field of view, the focal length of the optical lens system with a wide field of view is f, the f-number of the optical lens system with a wide field of view is Fno, the field of view of the optical lens system with a wide field of view is 2ω, and they satisfy the relations:

$f$=1.944 mm;

$F$no=2.0; and

2ω=89°.

In the first embodiment of the present optical lens system with a wide field of view, the focal length of the first lens element 110 is f1, the focal length of the second lens element 120 is f2, and they satisfy the relation:

$f1/f2$=−0.5899.

In the first embodiment of the present optical lens system with a wide field of view, the focal length of the second lens element 120 is f2, the focal length of the third lens element 130 is f3, and they satisfy the relation:

$f2/f3$=−1.9689.

In the first embodiment of the present optical lens system with a wide field of view, the focal length of the third lens element 130 is f3, the focal length of the fourth lens element 140 is f4, and they satisfy the relation:

$f3/f4$=−0.7772.

In the first embodiment of the present optical lens system with a wide field of view, the focal length of the first lens element 110 is f1, the focal length of the third lens element 130 is f3, and they satisfy the relation:

$f1/f3$=1.1615.

In the first embodiment of the present optical lens system with a wide field of view, the focal length of the second lens element 120 is f2, the focal length of the fourth lens element 140 is f4, and they satisfy the relation:

$f2/f4$=1.5303.

In the first embodiment of the present optical lens system with a wide field of view, the focal length of the first lens element 110 is f1, the focal length of the second lens element 120 and the third lens element 130 combined is f23, and they satisfy the relation:

$f1/f23$=0.8434.

In the first embodiment of the present optical lens system with a wide field of view, the focal length of the second lens element 120 and the third lens element 130 combined is f23, the focal length of the fourth lens element 140 is f4, and they satisfy the relation:

$f23/f4$=−1.0704.

In the first embodiment of the present optical lens system with a wide field of view, the focal length of the first lens element 110 and the second lens element 120 combined is f12, the focal length of the third lens element 130 and the fourth lens element 140 combined is f34, and they satisfy the relation:

$f12/f34=0.8104$.

In the first embodiment of the present optical lens system with a wide field of view, the focal length of the optical lens system with a wide field of view is f, the distance from the object-side surface 111 of the first lens element 110 to the image plane 160 along the optical axis 170 is TL, and they satisfy the relation:

$f/TL=0.6700$.

The detailed optical data of the first embodiment is shown in table 1, and the aspheric surface data is shown in table 2.

TABLE 1

(Embodiment 1)
f(focal length) = 1.944 mm, Fno = 2.0, 2ω = 89°.

| Surface | | Curvature Radius | Thickness | Material | nd | vd |
|---|---|---|---|---|---|---|
| 0 | Object | Infinity | Infinity | | | |
| 1 | | Infinity | 0 | | | |
| 2 | STO | Infinity | 0.03 | | | |
| 3 | Lens 1 | 2.030153(ASP) | 0.5185984 | Plastic | 1.535 | 56 |
| 4 | | −1.512895(ASP) | 0.0278959 | | | |
| 5 | Lens 2 | 4.780016(ASP) | 0.2382348 | Plastic | 1.634 | 23.9 |
| 6 | | 1.306853(ASP) | 0.2785785 | | | |
| 7 | Lens 3 | −1.576303(ASP) | 0.5168194 | Plastic | 1.535 | 56 |
| 8 | | −0.5848705(ASP) | 0.03161207 | | | |
| 9 | Lens 4 | 1.061478(ASP) | 0.305128 | Plastic | 1.535 | 56 |
| 10 | | 0.4660352(ASP) | 0.445035 | | | |
| 11 | IR-filter | Infinity | 0.21 | Glass | 1.5168 | 64.16734 |
| 12 | | Infinity | 0.3 | | | |
| 13 | Image | Infinity | | | | |

TABLE 2

Aspheric Coefficients

| Surface # | 3 | 4 | 5 | 6 |
|---|---|---|---|---|
| K = | −13.9814 | 4.513461 | −302.532 | −2.79147 |
| A = | −0.12379 | −0.30114 | −0.35616 | −0.06985 |
| B = | 0.670284 | 1.227751 | 0.390228 | −0.18356 |
| C = | −5.12507 | 0.823291 | 2.677109 | 1.23398 |
| D = | −7.58406 | −3.73062 | −2.90304 | −1.48832 |
| E = | 78.45036 | −2.33845 | −1.28447 | 2.155003 |
| F = | −101.066 | 29.44794 | 1.158896 | −1.64508 |

| Surface # | 7 | 8 | 9 | 10 |
|---|---|---|---|---|
| K = | −20.9092 | −3.6436 | −6.48208 | −3.96958 |
| A = | 0.060865 | −0.28952 | −0.2888 | −0.25258 |
| B = | 0.184839 | 0.393556 | 0.024272 | 0.160693 |
| C = | −0.11134 | −0.26645 | 0.126278 | −0.08237 |
| D = | −0.10857 | 0.394259 | −0.06027 | 0.025174 |
| E = | 0.159098 | 0.672242 | 0.007351 | −0.00392 |
| F = | −0.10022 | −0.87483 | 3.16E−04 | 2.45E−04 |

The units of the radius of curvature, the thickness and the focal length in table 1 are expressed in mm, the surface numbers 3-10 represent the surfaces sequentially arranged from the object-side to the image-side along the optical axis. In table 2, k represents the conic coefficient of the equation of the aspheric surface profiles, and A, B, C, D, E, G, . . . represent the high-order aspheric coefficients. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
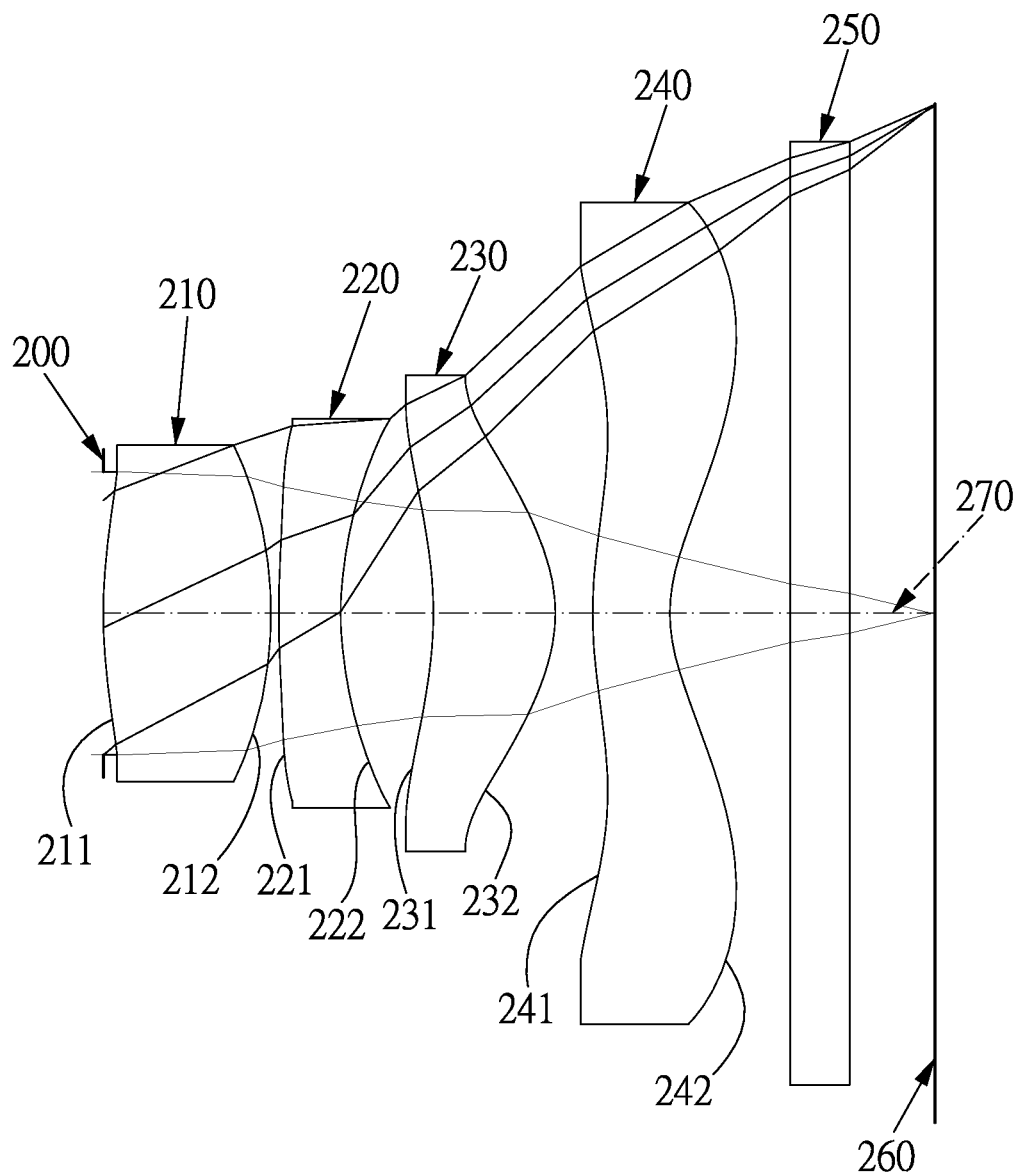
FIG. 2A shows an optical lens system with a wide field of view in accordance with a second embodiment of the present invention.
Figure 2B:
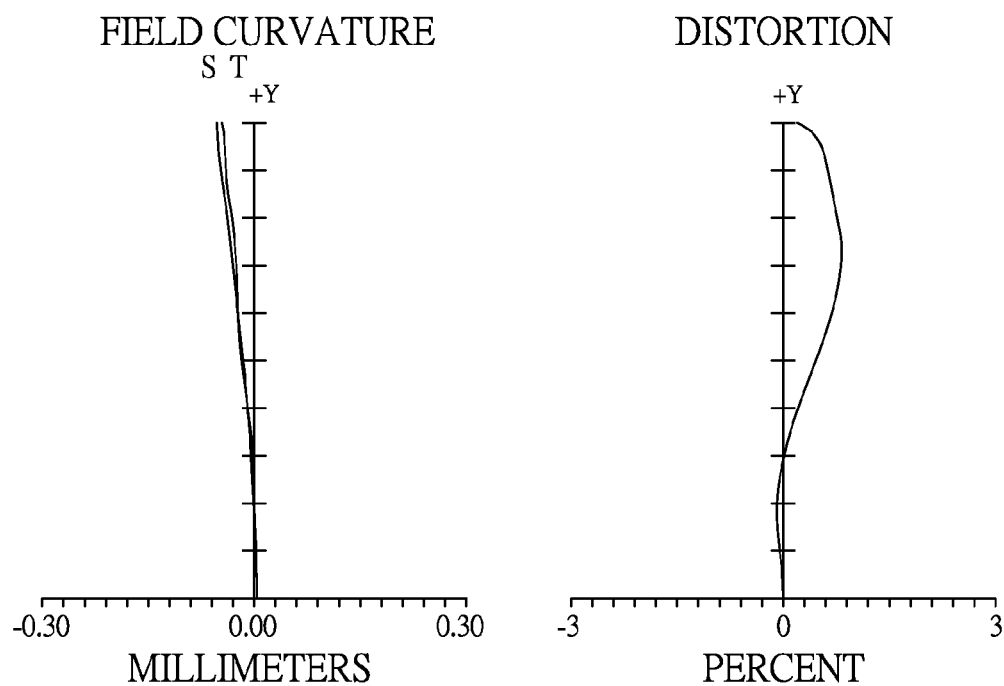
FIG. 2B shows the longitudinal spherical aberration curve, the astigmatic field curve and the distortion curve of the second embodiment of the present invention.
Figure 2B:
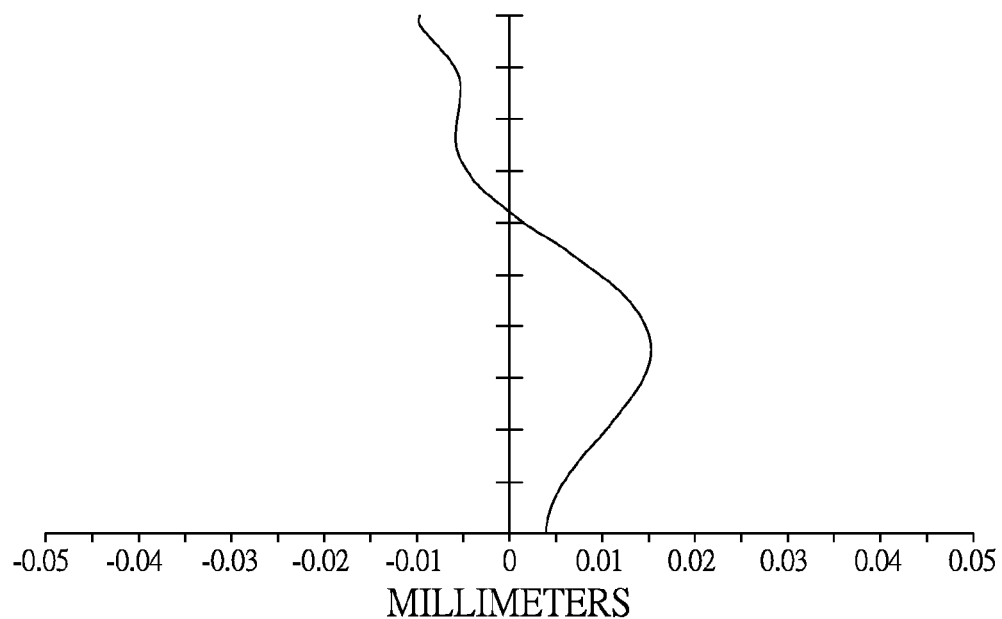

Referring to FIG. 2A shows an optical lens system with a wide field of view in accordance with a second embodiment of the present invention, and FIG. 2B shows, in order from left to right, the longitudinal spherical aberration curves, the astigmatic field curves, and the distortion curve of the second embodiment of the present invention. An optical lens system with a wide field of view in accordance with the second embodiment of the present invention comprises, in order from the object side to the image side: a stop 200, a first lens element 210, a second lens element 220, a third lens element 230 and a fourth lens element 240.

The first lens element 210 with a positive refractive power has an object-side surface 211 being convex near an optical axis 270 and an image-side surface 212 being convex near the optical axis 270, the object-side surface 211 and the image-side surface 212 are aspheric, and the first lens element 210 is made of plastic material.

The second lens element 220 with a negative refractive power has an object-side surface 221 being convex near the optical axis 270 and an image-side surface 222 being concave near the optical axis 270, the object-side surface 221 and the image-side surface 222 are aspheric, and the second lens element 220 is made of plastic material.

The third lens element 230 with a positive refractive power has an object-side surface 231 being concave near the optical axis 270 and an image-side surface 232 being convex near the optical axis 270, the object-side surface 231 and the image-side surface 232 are aspheric, and the third lens element 230 is made of plastic material.

The fourth lens element 240 with a negative refractive power has an object-side surface 241 being convex near the optical axis 270 and an image-side surface 242 being concave near the optical axis 270, the object-side surface 241 and the image-side surface 242 are aspheric, and the fourth lens element 240 is made of plastic material.

An IR cut filter 250 made of glass is located between the fourth lens element 240 and an image plane 260 and has no influence on the focal length of the optical lens system with a wide field of view.

The equation for the aspheric surface profiles of the second embodiment has the same form as that of the first embodiment. Therefore, an explanation in this regard will not be provided again.

In the second embodiment of the present optical lens system with a wide field of view, the focal length of the optical lens system with a wide field of view is f, the f-number of the optical lens system with a wide field of view is Fno, the field of view of the optical lens system with a wide field of view is 2ω, and they satisfy the relations:

$f=2.129$ mm;

$Fno=2.0$; and $2\omega=85°$.

In the second embodiment of the present optical lens system with a wide field of view, the focal length of the first lens element 210 is f1, the focal length of the second lens element 220 is f2, and they satisfy the relation:

$f1/f2=-0.5530$.

In the second embodiment of the present optical lens system with a wide field of view, the focal length of the second lens element 220 is f2, the focal length of the third lens element 230 is f3, and they satisfy the relation:

$f2/f3=-2.1201$.

In the second embodiment of the present optical lens system with a wide field of view, the focal length of the third lens element 230 is f3, the focal length of the fourth lens element 240 is f4, and they satisfy the relation:

$f3/f4=-0.9122$.

In the second embodiment of the present optical lens system with a wide field of view, the focal length of the first lens element 210 is f1, the focal length of the third lens element 230 is f3, and they satisfy the relation:

$f1/f3=1.1725$.

In the second embodiment of the present optical lens system with a wide field of view, the focal length of the second lens element 220 is f2, the focal length of the fourth lens element 240 is f4, and they satisfy the relation:

$f2/f4=1.9340$.

In the second embodiment of the present optical lens system with a wide field of view, the focal length of the first lens element 210 is f1, the focal length of the second lens element 220 and the third lens element 230 combined is f23, and they satisfy the relation:

$f1/f23=0.8544$.

In the second embodiment of the present optical lens system with a wide field of view, the focal length of the second lens element 220 and the third lens element 230 combined is f23, the focal length of the fourth lens element 240 is f4, and they satisfy the relation:

$f23/f4=-1.2518$.

In the second embodiment of the present optical lens system with a wide field of view, the focal length of the first lens element 210 and the second lens element 220 combined is f12, the focal length of the third lens element 230 and the fourth lens element 240 combined is f34, and they satisfy the relation:

$f12/f34=0.4998$.

In the second embodiment of the present optical lens system with a wide field of view, the focal length of the optical lens system with a wide field of view is f, the distance from the object-side surface 211 of the first lens element 210 to the image plane 260 along the optical axis 270 is TL, and they satisfy the relation:

$f/TL=0.7256$.

The detailed optical data of the second embodiment is shown in table 3, and the aspheric surface data is shown in table 4.

TABLE 3

(Embodiment 2)
f(focal length) = 2.129 mm, Fno = 2.0, 2ω = 85°.

| Surface | | Curvature Radius | Thickness | Material | nd | vd |
|---|---|---|---|---|---|---|
| 0 | Object | Infinity | Infinity | | | |
| 1 | | Infinity | 0 | | | |
| 2 | STO | Infinity | 0 | | | |
| 3 | Lens 1 | 1.95721(ASP) | 0.5906047 | Plastic | 1.535 | 56 |
| 4 | | −1.66334(ASP) | 0.02843588 | | | |
| 5 | Lens 2 | 3.368045(ASP) | 0.2180171 | Plastic | 1.634 | 23.9 |
| 6 | | 1.245526(ASP) | 0.3272921 | | | |
| 7 | Lens 3 | −1.431403(ASP) | 0.4305115 | Plastic | 1.535 | 56 |
| 8 | | −0.5730878(ASP) | 0.1316351 | | | |
| 9 | Lens 4 | 1.585634(ASP) | 0.2719439 | Plastic | 1.535 | 56 |
| 10 | | 0.5364683(ASP) | 0.4250364 | | | |
| 11 | IR-filter | Infinity | 0.21 | Glass | 1.5168 | 64.16734 |
| 12 | | Infinity | 0.3 | | | |
| 13 | Image | Infinity | | | | |

TABLE 4

Aspheric Coefficients

| Surface # | 3 | 4 | 5 | 6 |
|---|---|---|---|---|
| K = | −9.57941 | 5.083752 | −60.8253 | −2.88836 |
| A = | −0.10414 | −0.26193 | −0.34698 | −0.07499 |
| B = | 0.624718 | 1.05384 | 0.334061 | −0.1891 |
| C = | −4.16827 | 0.511227 | 2.547678 | 1.238068 |
| D = | −3.14317 | −3.29284 | −3.06302 | −1.24182 |
| E = | 55.76015 | 1.193206 | −1.72306 | 2.322181 |
| F = | −96.1815 | 10.3263 | 2.259433 | −2.85115 |

| Surface # | 7 | 8 | 9 | 10 |
|---|---|---|---|---|
| K = | −11.1417 | −3.41513 | −11.8879 | −4.72523 |
| A = | 0.009626 | −0.27837 | −0.2931 | −0.26382 |
| B = | 0.211772 | 0.409759 | 0.036143 | 0.173631 |
| C = | −0.0447 | −0.19557 | 0.125719 | −0.09237 |
| D = | −0.0847 | 0.492751 | −0.06376 | 0.026615 |
| E = | 0.117762 | 0.694005 | 0.006485 | −0.00255 |
| F = | 0.038533 | −1.06632 | 9.28E−04 | −3.88E−04 |

Figure 3A:
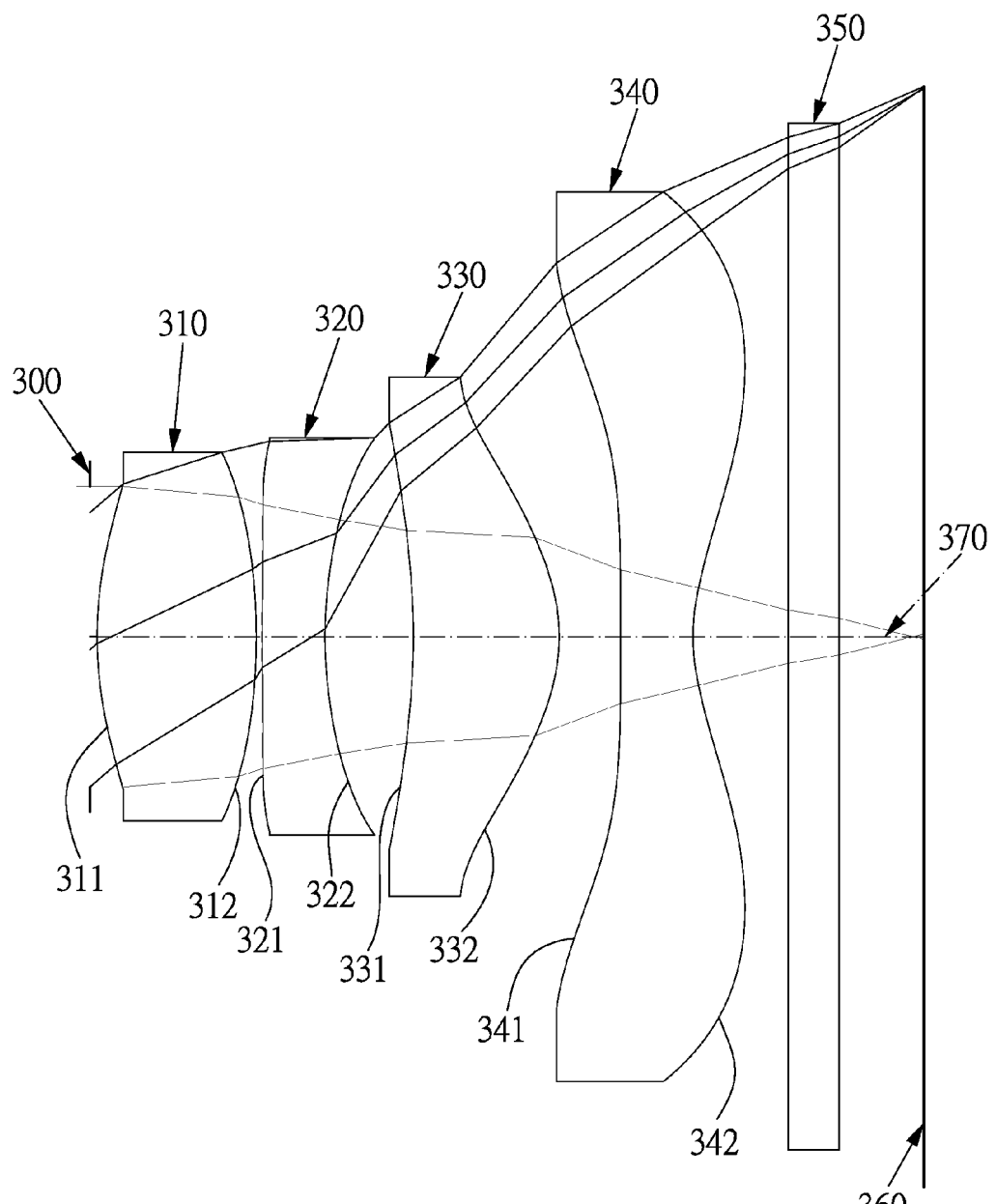
FIG. 3A shows an optical lens system with a wide field of view in accordance with a third embodiment of the present invention.
Figure 3B:
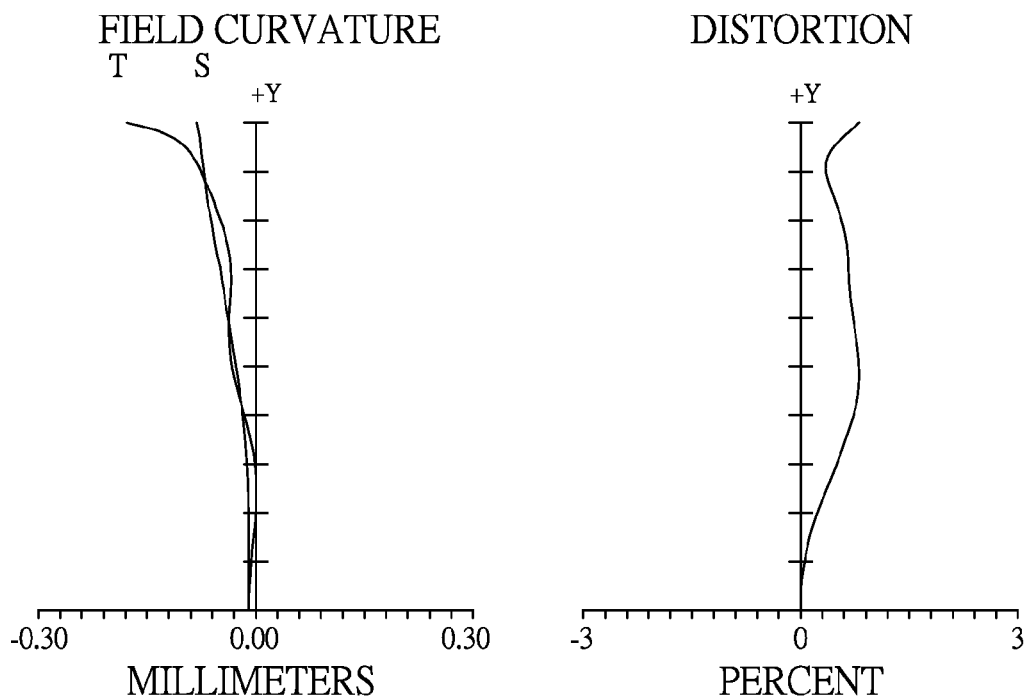
FIG. 3B shows the longitudinal spherical aberration curve, the astigmatic field curve and the distortion curve of the third embodiment of the present invention.
Figure 3B:
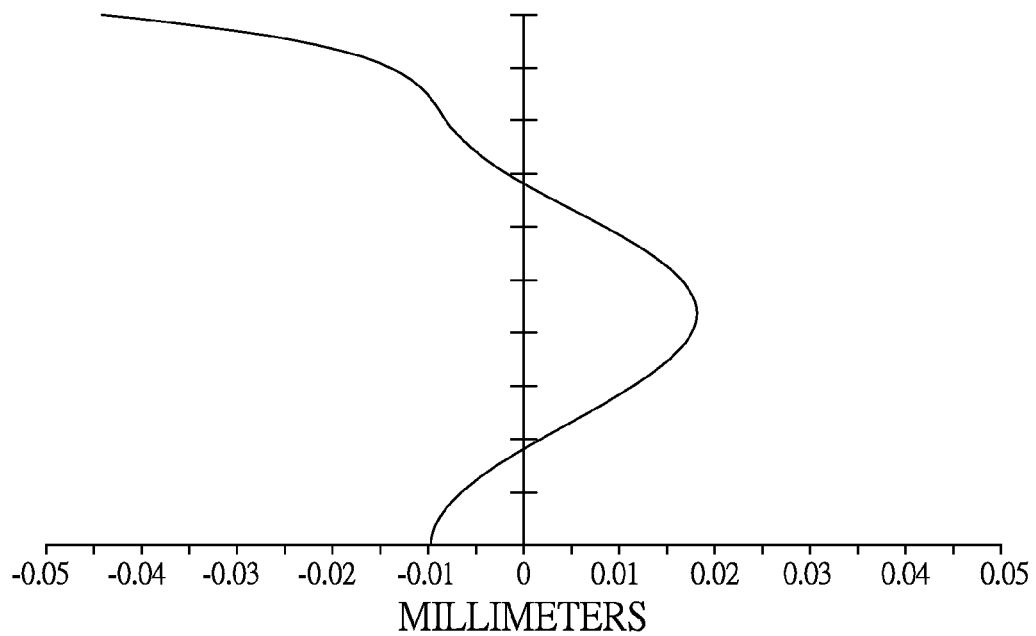

Referring to FIG. 3A shows an optical lens system with a wide field of view in accordance with a third embodiment of the present invention, and FIG. 3B shows, in order from left to right, the longitudinal spherical aberration curves, the astigmatic field curves, and the distortion curve of the third embodiment of the present invention. An optical lens system with a wide field of view in accordance with the third embodiment of the present invention comprises, in order from the object side to the image side: a stop 300, a first lens element 310, a second lens element 320, a third lens element 330 and a fourth lens element 340.

The first lens element 310 with a positive refractive power has an object-side surface 311 being convex near an optical axis 370 and an image-side surface 312 being convex near the optical axis 370, the object-side surface 311 and the image-side surface 312 are aspheric, and the first lens element 310 is made of plastic material.

The second lens element 320 with a negative refractive power has an object-side surface 321 being convex near the optical axis 370 and an image-side surface 322 being concave near the optical axis 370, the object-side surface 321 and the image-side surface 322 are aspheric, and the second lens element 320 is made of plastic material.

The third lens element 330 with a positive refractive power has an object-side surface 331 being concave near the optical axis 370 and an image-side surface 332 being convex near the optical axis 370, the object-side surface 331 and the image-side surface 332 are aspheric, and the third lens element 330 is made of plastic material.

The fourth lens element 340 with a negative refractive power has an object-side surface 341 being convex near the optical axis 370 and an image-side surface 342 being concave near the optical axis 370, the object-side surface 341 and the image-side surface 242 are aspheric, and the fourth lens element 340 is made of plastic material.

An IR cut filter 350 made of glass is located between the fourth lens element 340 and an image plane 360 and has no influence on the focal length of the optical lens system with a wide field of view.

The equation for the aspheric surface profiles of the third embodiment has the same form as that of the first embodiment. Therefore, an explanation in this regard will not be provided again.

In the third embodiment of the present optical lens system with a wide field of view, the focal length of the optical lens system with a wide field of view is f, the f-number of the optical lens system with a wide field of view is Fno, the field of view of the optical lens system with a wide field of view is 2ω, and they satisfy the relations:

$f$=2.607 mm;

$Fno$=2.0; and

2ω=85°.

In the third embodiment of the present optical lens system with a wide field of view, the focal length of the first lens element 310 is f1, the focal length of the second lens element 320 is f2, and they satisfy the relation:

$f1/f2$=−0.5847.

In the third embodiment of the present optical lens system with a wide field of view, the focal length of the second lens element 320 is f2, the focal length of the third lens element 330 is f3, and they satisfy the relation:

$f2/f3$=−2.0616.

In the third embodiment of the present optical lens system with a wide field of view, the focal length of the third lens element 330 is f3, the focal length of the fourth lens element 340 is f4, and they satisfy the relation:

$f3/f4$=−1.0438.

In the third embodiment of the present optical lens system with a wide field of view, the focal length of the first lens element 310 is f1, the focal length of the third lens element 330 is f3, and they satisfy the relation:

$f1/f3$=1.2054.

In the third embodiment of the present optical lens system with a wide field of view, the focal length of the second lens element 320 is f2, the focal length of the fourth lens element 340 is f4, and they satisfy the relation:

$f2/f4$=2.1519.

In the third embodiment of the present optical lens system with a wide field of view, the focal length of the first lens element 310 is f1, the focal length of the second lens element 320 and the third lens element 330 combined is f23, and they satisfy the relation:

$f1/f23$=0.9019.

In the third embodiment of the present optical lens system with a wide field of view, the focal length of the second lens element 320 and the third lens element 330 combined is f23, the focal length of the fourth lens element 340 is f4, and they satisfy the relation:

$f23/f4$=−1.3950.

In the third embodiment of the present optical lens system with a wide field of view, the focal length of the first lens element 310 and the second lens element 320 combined is f12, the focal length of the third lens element 330 and the fourth lens element 340 combined is f34, and they satisfy the relation:

$f12/f34$=0.3571.

In the third embodiment of the present optical lens system with a wide field of view, the focal length of the optical lens system with a wide field of view is f, the distance from the object-side surface 311 of the first lens element 310 to the image plane 360 along the optical axis 370 is TL, and they satisfy the relation:

$f/TL$=0.7559.

The detailed optical data of the third embodiment is shown in table 5, and the aspheric surface data is shown in table 6.

TABLE 5

(Embodiment 3)

f(focal length) = 2.607 mm, Fno = 2.0, 2ω = 85°.

| Surface | | Curvature Radius | Thickness | Material | nd | vd |
|---|---|---|---|---|---|---|
| 0 | Object | Infinity | Infinity | | | |
| 1 | | Infinity | 0 | | | |
| 2 | STO | Infinity | 0.03 | | | |
| 3 | Lens 1 | 1.637791(ASP) | 0.6584651 | Plastic | 1.535 | 56 |
| 4 | | −2.827973(ASP) | 0.02461859 | | | |
| 5 | Lens 2 | 12.98404(ASP) | 0.2597423 | Plastic | 1.634 | 23.9 |
| 6 | | 1.890762(ASP) | 0.3653505 | | | |
| 7 | Lens 3 | −3.137961(ASP) | 0.6038581 | Plastic | 1.535 | 56 |
| 8 | | −0.751018(ASP) | 0.252699 | | | |
| 9 | Lens 4 | 46.29152(ASP) | 0.300214 | Plastic | 1.535 | 56 |
| 10 | | 0.8511466(ASP) | 0.3942761 | | | |
| 11 | IR-filter | Infinity | 0.21 | Glass | 1.5168 | 64.16734 |
| 12 | | Infinity | 0.35 | | | |
| 13 | Image | Infinity | | | | |

TABLE 6

Aspheric Coefficients

| Surface # | 3 | 4 | 5 | 6 |
|---|---|---|---|---|
| K = | −4.11243 | 9.838501 | 176.1043 | −0.91041 |
| A = | −0.0065 | −0.1067 | −0.19458 | −0.01551 |
| B = | 0.259265 | 0.212684 | 0.151581 | −0.04312 |
| C = | −0.80596 | 3.96E−04 | 0.538834 | 0.248867 |
| D = | −0.77163 | −0.31563 | −0.43003 | −0.07622 |
| E = | 3.419118 | 0.233018 | −0.26018 | 0.293554 |
| F = | −2.4713 | 0.228037 | 0.245145 | −0.34876 |

| Surface # | 7 | 8 | 9 | 10 |
|---|---|---|---|---|
| K = | −18.2258 | −3.3703 | 470.8023 | −5.99271 |
| A = | −0.00609 | −0.11418 | −0.15668 | −0.14697 |
| B = | 0.025603 | 0.119032 | 0.023761 | 0.067113 |
| C = | −0.04122 | −0.05447 | 0.025925 | −0.02189 |
| D = | −0.00378 | 0.051806 | −0.00841 | 0.003076 |
| E = | 0.034679 | 0.053732 | 1.60E−04 | −6.05E−05 |
| F = | −0.00725 | −0.04659 | 1.24E−04 | −2.20E−05 |

Figure 4A:
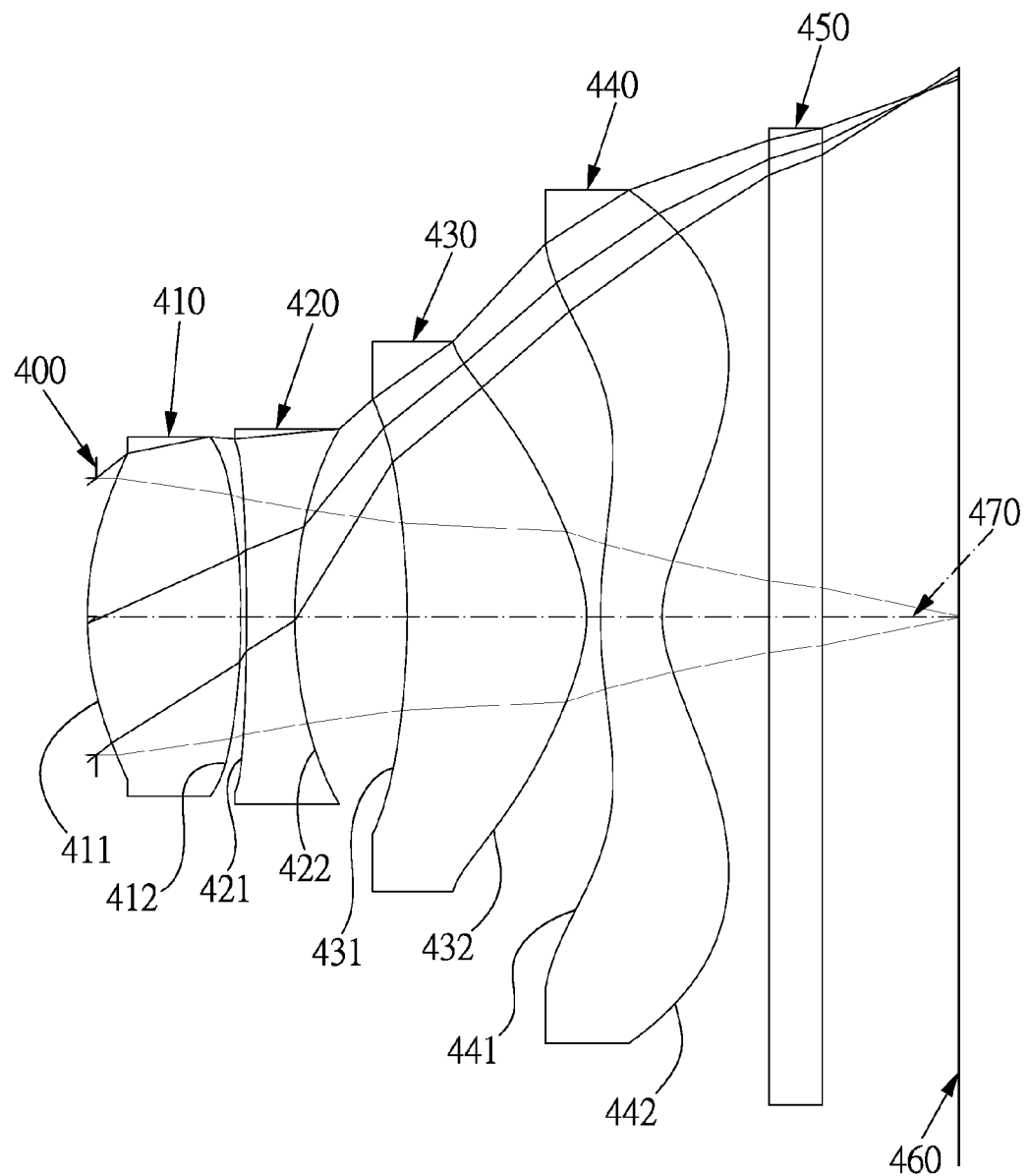
FIG. 4A shows an optical lens system with a wide field of view in accordance with a fourth embodiment of the present invention.
Figure 4B:
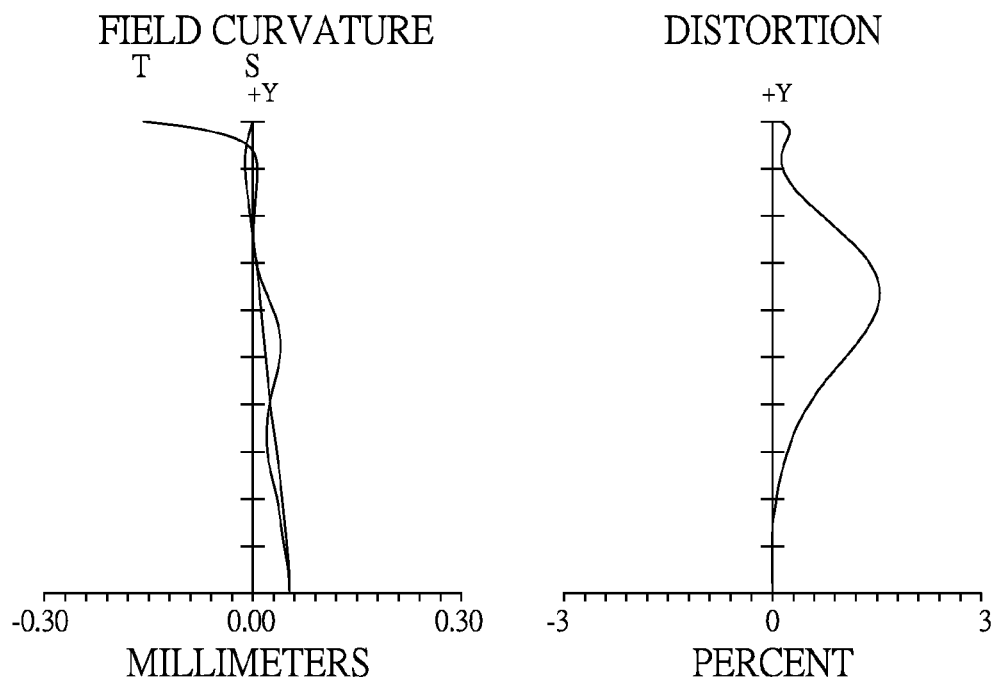
FIG. 4B shows the longitudinal spherical aberration curve, the astigmatic field curve and the distortion curve of the fourth embodiment of the present invention.
Figure 4B:
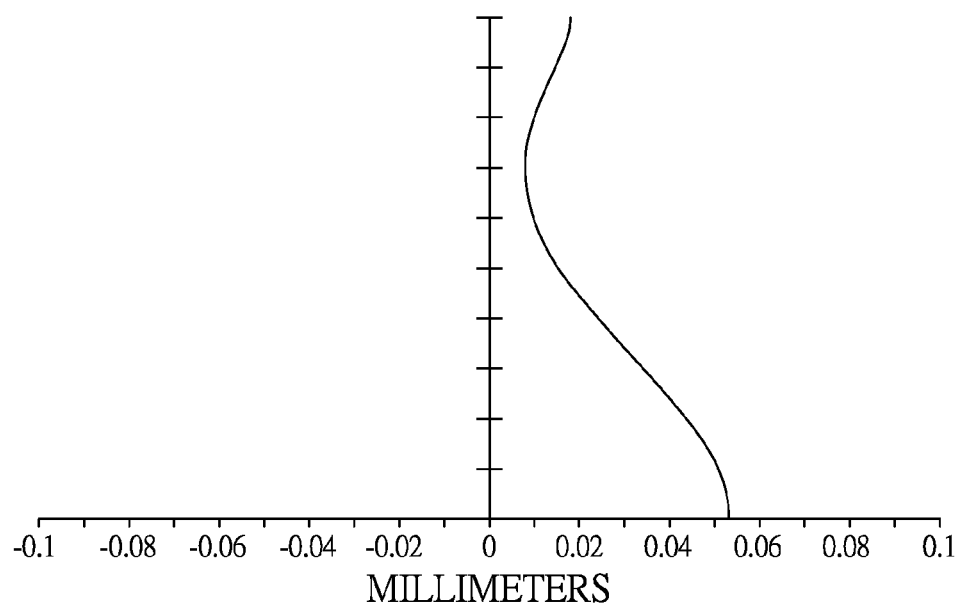

Referring to FIG. 4A shows an optical lens system with a wide field of view in accordance with a fourth embodiment of the present invention, and FIG. 4B shows, in order from left to right, the longitudinal spherical aberration curves, the astigmatic field curves, and the distortion curve of the fourth embodiment of the present invention. An optical lens system with a wide field of view in accordance with the fourth embodiment of the present invention comprises, in order from the object side to the image side: a stop 400, a first lens element 410, a second lens element 420, a third lens element 430 and a fourth lens element 440.

The first lens element 410 with a positive refractive power has an object-side surface 411 being convex near an optical axis 470 and an image-side surface 412 being convex near the optical axis 470, the object-side surface 411 and the image-side surface 412 are aspheric, and the first lens element 410 is made of plastic material.

The second lens element 420 with a negative refractive power has an object-side surface 421 being concave near the optical axis 470 and an image-side surface 422 being concave near the optical axis 470, the object-side surface 421 and the image-side surface 422 are aspheric, and the second lens element 420 is made of plastic material.

The third lens element 430 with a positive refractive power has an object-side surface 431 being concave near the optical axis 470 and an image-side surface 432 being convex near the optical axis 470, the object-side surface 431 and the image-side surface 432 are aspheric, and the third lens element 430 is made of plastic material.

The fourth lens element 440 with a negative refractive power has an object-side surface 441 being convex near the optical axis 470 and an image-side surface 442 being concave near the optical axis 470, the object-side surface 441 and the image-side surface 442 are aspheric, and the fourth lens element 440 is made of plastic material.

An IR cut filter 450 made of glass is located between the fourth lens element 440 and an image plane 460 and has no influence on the focal length of the optical lens system with a wide field of view.

The equation for the aspheric surface profiles of the fourth embodiment has the same form as that of the first embodiment. Therefore, an explanation in this regard will not be provided again.

In the fourth embodiment of the present optical lens system with a wide field of view, the focal length of the optical lens system with a wide field of view is f, the f-number of the optical lens system with a wide field of view is Fno, the field of view of the optical lens system with a wide field of view is 2ω, and they satisfy the relations:

$f=3.903$ mm;

$Fno=2.4$; and $2\omega=79°$.

In the fourth embodiment of the present optical lens system with a wide field of view, the focal length of the first lens element 410 is f1, the focal length of the second lens element 420 is f2, and they satisfy the relation:

$f1/f2=-0.6878$.

In the fourth embodiment of the present optical lens system with a wide field of view, the focal length of the second lens element 420 is f2, the focal length of the third lens element 430 is f3, and they satisfy the relation:

$f2/f3=-2.2403$.

In the fourth embodiment of the present optical lens system with a wide field of view, the focal length of the third lens element 430 is f3, the focal length of the fourth lens element 440 is f4, and they satisfy the relation:

$f3/f4=-0.9863$.

In the fourth embodiment of the present optical lens system with a wide field of view, the focal length of the first lens element 410 is f1, the focal length of the third lens element 430 is f3, and they satisfy the relation:

$$f1/f3=1.5410.$$

In the fourth embodiment of the present optical lens system with a wide field of view, the focal length of the second lens element 420 is f2, the focal length of the fourth lens element 440 is f4, and they satisfy the relation:

$$f2/f4=2.2096.$$

In the fourth embodiment of the present optical lens system with a wide field of view, the focal length of the first lens element 410 is f1, the focal length of the second lens element 420 and the third lens element 430 combined is f23, and they satisfy the relation:

$$f1/f23=1.4183.$$

In the fourth embodiment of the present optical lens system with a wide field of view, the focal length of the second lens element 420 and the third lens element 430 combined is f23, the focal length of the fourth lens element 440 is f4, and they satisfy the relation:

$$f23/f4=-1.0716.$$

In the fourth embodiment of the present optical lens system with a wide field of view, the focal length of the first lens element 410 and the second lens element 420 combined is f12, the focal length of the third lens element 430 and the fourth lens element 440 combined is f34, and they satisfy the relation:

$$f12/f34=0.5146.$$

In the fourth embodiment of the present optical lens system with a wide field of view, the focal length of the optical lens system with a wide field of view is f, the distance from the object-side surface 411 of the first lens element 410 to the image plane 460 along the optical axis 470 is TL, and they satisfy the relation:

$$f/TL=0.7965.$$

The detailed optical data of the fourth embodiment is shown in table 5, and the aspheric surface data is shown in table 6.

TABLE 7

(Embodiment 4)

f(focal length) = 3.903 mm, Fno = 2.4, 2ω = 79°.

| Surface | | Curvature Radius | Thickness | Material | nd | vd |
|---|---|---|---|---|---|---|
| 0 | Object | Infinity | Infinity | | | |
| 1 | | Infinity | 0.05 | | | |
| 2 | STO | Infinity | −0.05 | | | |
| 3 | Lens 1 | 1.865962(ASP) | 0.8630052 | Plastic | 1.535 | 56 |
| 4 | | −4.618696(ASP) | 0.03 | | | |
| 5 | Lens 2 | −25.17302(ASP) | 0.2734822 | Plastic | 1.632 | 23 |
| 6 | | 2.556563(ASP) | 0.6323514 | | | |
| 7 | Lens 3 | −4.109367(ASP) | 1.007038 | Plastic | 1.535 | 56 |
| 8 | | −0.8048056(ASP) | 0.07969951 | | | |
| 9 | Lens 4 | 2.850741(ASP) | 0.3460797 | Plastic | 1.544 | 56 |
| 10 | | 0.6737187(ASP) | 0.6 | | | |
| 11 | IR-filter | Infinity | 0.3 | Glass | 1.5168 | 64.16734 |
| 12 | | Infinity | 0.7689038 | | | |
| 13 | Image | Infinity | | | | |

TABLE 8

Aspheric Coefficients

| Surface # | 3 | 4 | 5 | 6 |
|---|---|---|---|---|
| K = | −0.60054 | −2.14684 | 514.0687 | −0.24193 |
| A = | 0.006123 | −0.02728 | −0.04281 | −0.00139 |
| B = | −0.00783 | 0.045035 | 0.021514 | −0.01454 |
| C = | 9.10E−04 | −0.04391 | 0.058739 | 0.06309 |
| D = | −0.00738 | −0.03184 | −0.07609 | −0.03127 |
| E = | −0.00909 | −2.76E−04 | 0.001068 | 0.001723 |
| F = | 5.28E−04 | −2.01E−05 | −2.07E−07 | 1.23E−04 |

| Surface # | 7 | 8 | 9 | 10 |
|---|---|---|---|---|
| K = | −59.5898 | −5.05938 | −2.82542 | −4.95219 |
| A = | −0.0262 | −0.04299 | −0.1026 | −0.06085 |
| B = | −0.00246 | −0.0024 | −0.00105 | 0.009736 |
| C = | −0.00967 | −0.00208 | 0.005708 | −0.00149 |
| D = | 0.003827 | 0.002018 | −6.33E−04 | 9.13E−05 |
| E = | −3.03E−05 | 4.02E−05 | 4.42E−06 | 6.15E−07 |
| F = | −1.71E−04 | 5.22E−05 | −1.18E−07 | −2.10E−07 |

Figure 5A:
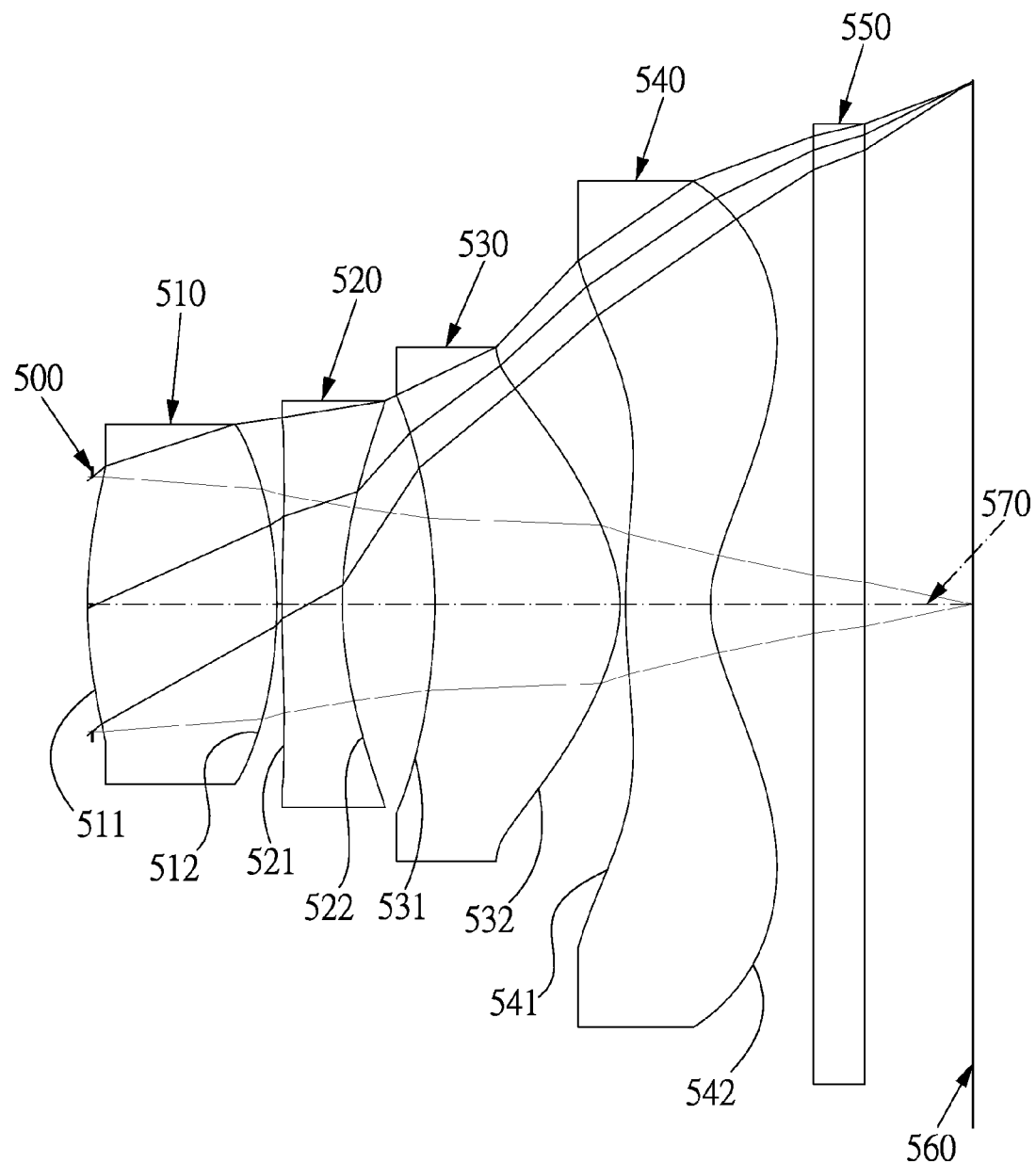
FIG. 5A shows an optical lens system with a wide field of view in accordance with a fifth embodiment of the present invention.
Figure 5B:
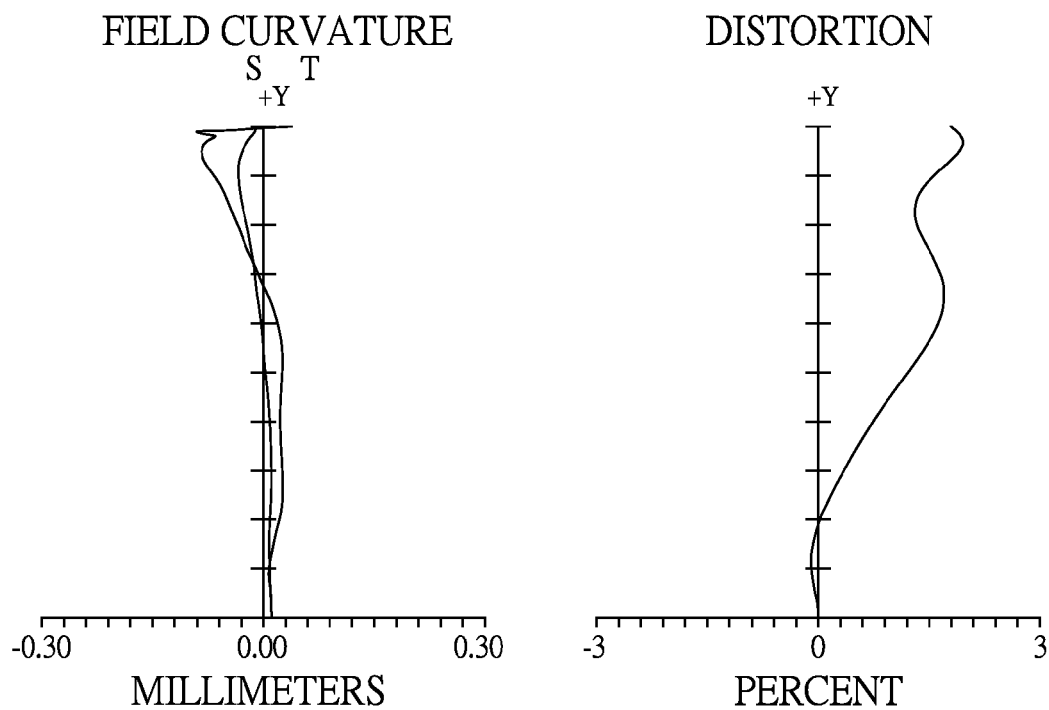
FIG. 5B shows the longitudinal spherical aberration curve, the astigmatic field curve and the distortion curve of the fifth embodiment of the present invention.
Figure 5B:
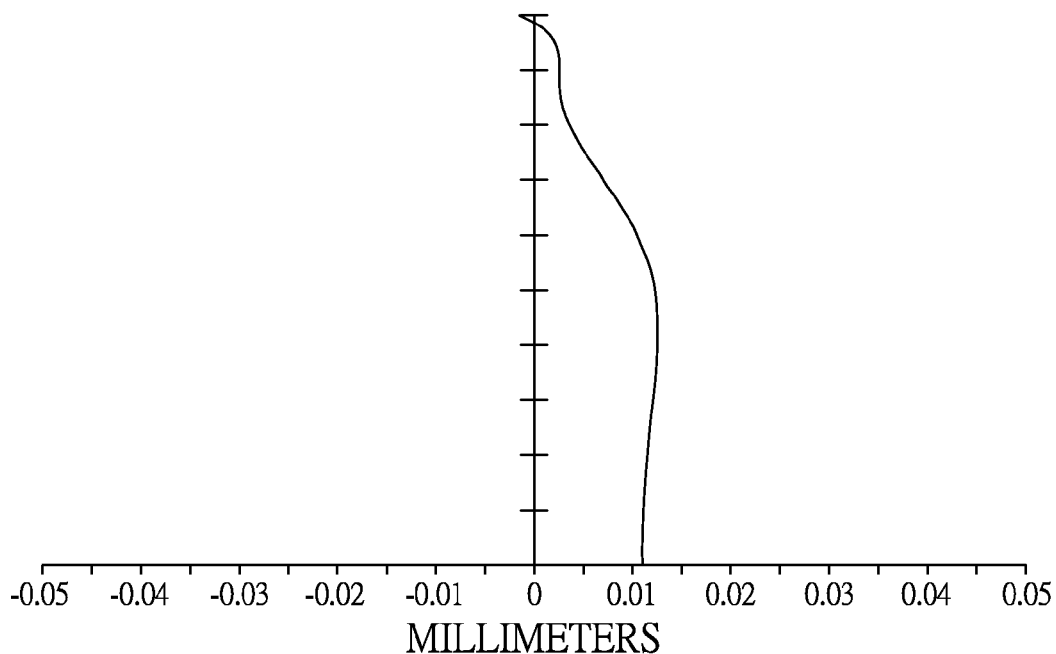

Referring to FIG. 5A shows an optical lens system with a wide field of view in accordance with a fifth embodiment of the present invention, and FIG. 5B shows, in order from left to right, the longitudinal spherical aberration curves, the astigmatic field curves, and the distortion curve of the fifth embodiment of the present invention. An optical lens system with a wide field of view in accordance with the fifth embodiment of the present invention comprises, in order from the object side to the image side: a stop 500, a first lens element 510, a second lens element 520, a third lens element 530 and a fourth lens element 540.

The first lens element 510 with a positive refractive power has an object-side surface 511 being convex near an optical axis 570 and an image-side surface 512 being convex near the optical axis 570, the object-side surface 511 and the image-side surface 512 are aspheric, and the first lens element 510 is made of plastic material.

The second lens element 520 with a negative refractive power has an object-side surface 521 being convex near the optical axis 570 and an image-side surface 522 being concave near the optical axis 570, the object-side surface 521 and the image-side surface 522 are aspheric, and the second lens element 520 is made of plastic material.

The third lens element 530 with a positive refractive power has an object-side surface 531 being concave near the optical axis 570 and an image-side surface 532 being convex near the optical axis 570, the object-side surface 531 and the image-side surface 532 are aspheric, and the third lens element 530 is made of plastic material.

The fourth lens element 540 with a negative refractive power has an object-side surface 541 being convex near the optical axis 570 and an image-side surface 542 being concave near the optical axis 570, the object-side surface 541 and the image-side surface 542 are aspheric, and the fourth lens element 540 is made of plastic material.

An IR cut filter 550 made of glass is located between the fourth lens element 540 and an image plane 560 and has no influence on the focal length of the optical lens system with a wide field of view.

The equation for the aspheric surface profiles of the fifth embodiment has the same form as that of the first embodiment. Therefore, an explanation in this regard will not be provided again.

In the fifth embodiment of the present optical lens system with a wide field of view, the focal length of the optical lens system with a wide field of view is f, the f-number of the optical lens system with a wide field of view is Fno, the field of view of the optical lens system with a wide field of view is 2ω, and they satisfy the relations:

$f=3.684$ mm;

$Fno=2.4$; and $2\omega=79°$.

In the fifth embodiment of the present optical lens system with a wide field of view, the focal length of the first lens element 510 is f1, the focal length of the second lens element 520 is f2, and they satisfy the relation:

$f1/f2=-0.5737$.

In the fifth embodiment of the present optical lens system with a wide field of view, the focal length of the second lens element 520 is f2, the focal length of the third lens element 530 is f3, and they satisfy the relation:

$f2/f3=-2.8478$.

In the fifth embodiment of the present optical lens system with a wide field of view, the focal length of the third lens element 530 is f3, the focal length of the fourth lens element 540 is f4, and they satisfy the relation:

$f3/f4=-0.9878$.

In the fifth embodiment of the present optical lens system with a wide field of view, the focal length of the first lens element 510 is f1, the focal length of the third lens element 530 is f3, and they satisfy the relation:

$f1/f3=1.6339$.

In the fifth embodiment of the present optical lens system with a wide field of view, the focal length of the second lens element 520 is f2, the focal length of the fourth lens element 540 is f4, and they satisfy the relation:

$f2/f4=2.8130$.

In the fifth embodiment of the present optical lens system with a wide field of view, the focal length of the first lens element 510 is f1, the focal length of the second lens element 520 and the third lens element 530 combined is f23, and they satisfy the relation:

$f1/f23=1.4778$.

In the fifth embodiment of the present optical lens system with a wide field of view, the focal length of the second lens element 520 and the third lens element 530 combined is f23, the focal length of the fourth lens element 540 is f4, and they satisfy the relation:

$f23/f4=-1.0921$.

In the fifth embodiment of the present optical lens system with a wide field of view, the focal length of the first lens element 510 and the second lens element 520 combined is f12, the focal length of the third lens element 530 and the fourth lens element 540 combined is f34, and they satisfy the relation:

$f12/f34=0.4245$.

In the fifth embodiment of the present optical lens system with a wide field of view, the focal length of the optical lens system with a wide field of view is f, the distance from the object-side surface 511 of the first lens element 510 to the image plane 460 along the optical axis 570 is TL, and they satisfy the relation:

$f/TL=0.7142$.

The detailed optical data of the fifth embodiment is shown in table 9, and the aspheric surface data is shown in table 10.

TABLE 9

(Embodiment 5)
f(focal length) = 3.684 mm, Fno = 2.4, 2ω = 79°.

| Surface | | Curvature Radius | Thickness | Material | nd | vd |
| --- | --- | --- | --- | --- | --- | --- |
| 0 | Object | Infinity | Infinity | | | |
| 1 | | Infinity | 0.03 | | | |
| 2 | STO | Infinity | −0.03 | | | |
| 3 | Lens 1 | 2.737835(ASP) | 1.103854 | Plastic | 1.535 | 56 |
| 4 | | −2.965129(ASP) | 0.03018541 | | | |
| 5 | Lens 2 | 7.91933(ASP) | 0.3507643 | Plastic | 1.634 | 23.9 |
| 6 | | 2.229996(ASP) | 0.5397752 | | | |
| 7 | Lens 3 | −3.137681(ASP) | 1.078259 | Plastic | 1.535 | 56 |
| 8 | | −0.8064306(ASP) | 0.03319082 | | | |
| 9 | Lens 4 | 3.873733(ASP) | 0.4924871 | Plastic | 1.535 | 56 |
| 10 | | 0.7265553(ASP) | 0.6 | | | |
| 11 | IR-filter | Infinity | 0.3 | Glass | 1.5168 | 64.16734 |
| 12 | | Infinity | 0.6300046 | | | |
| 13 | Image | Infinity | | | | |

TABLE 10

| Aspheric Coefficients | | | | |
|---|---|---|---|---|
| Surface # | 3 | 4 | 5 | 6 |
| K = | −2.18358 | 2.633707 | −115.424 | −2.91428 |
| A = | −0.00998 | −0.04445 | −0.07259 | −0.01674 |
| B = | −0.0132 | 0.038641 | 0.008576 | −0.03363 |
| C = | 0.008963 | −0.01021 | 0.057749 | 0.057176 |
| D = | −0.01143 | 0.005068 | −0.04978 | −0.02717 |
| E = | −0.05299 | 0.004928 | 0.043916 | 0.006015 |
| F = | 0.065967 | −0.01489 | −0.02592 | −0.0024 |
| Surface # | 7 | 8 | 9 | 10 |
| K = | −19.5898 | −4.15931 | −0.7756 | −5.14489 |
| A = | −0.02132 | −0.07286 | −0.0979 | −0.05624 |
| B = | −0.00236 | 0.017066 | 0.001765 | 0.012462 |
| C = | −0.00666 | −0.00329 | 0.005484 | −0.00253 |
| D = | 0.005671 | 0.001076 | −8.33E−04 | 2.21E−04 |
| E = | −0.00176 | 3.23E−04 | 1.59E−05 | 8.72E−06 |
| F = | 4.85E−05 | 2.00E−04 | 2.26E−06 | −2.23E−06 |

TABLE 11

| | Embodi-ment 1 | Embodi-ment 2 | Embodi-ment 3 | Embodi-ment 4 | Embodi-ment 5 |
|---|---|---|---|---|---|
| f | 1.944 | 2.129 | 2.607 | 3.903 | 3.684 |
| Fno | 2.0 | 2.0 | 2.0 | 2.4 | 2.4 |
| 2ω | 89 | 85 | 85 | 79 | 79 |
| f1/f2 | −0.5899 | −0.5530 | −0.5847 | −0.6878 | −0.5737 |
| f2/f3 | −1.9689 | −2.1201 | −2.0616 | −2.2403 | −2.8478 |
| f3/f4 | −0.7772 | −0.9122 | −1.0438 | −0.9863 | −0.9878 |
| f1/f3 | 1.1615 | 1.1725 | 1.2054 | 1.5410 | 1.6339 |
| f2/f4 | 1.5303 | 1.9340 | 2.1519 | 2.2096 | 2.8130 |
| f1/f23 | 0.8434 | 0.8544 | 0.9019 | 1.4183 | 1.4778 |
| f23/f4 | −1.0704 | −1.2518 | −1.3950 | −1.0716 | −1.0921 |
| f12/f34 | 0.8104 | 0.4998 | 0.3571 | 0.5146 | 0.4245 |
| f/TL | 0.6700 | 0.7256 | 0.7559 | 0.7965 | 0.7142 |

In the present optical lens system with a wide field of view, the lens elements can be made of plastic or glass. If the lens elements are made of plastic, the cost will be effectively reduced. If the lens elements are made of glass, there is more freedom in distributing the refractive power of the optical lens system with a wide field of view. Plastic lens elements can have aspheric surfaces, which allow more design parameter freedom (than spherical surfaces), so as to reduce the aberration and the number of the lens elements, as well as the total track length of the optical lens system with a wide field of view.

In the present optical lens system with a wide field of view, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave. Table 11 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system with a wide field of view comprising, in order from an object side to an image side:
a stop;
a first lens element with a positive refractive power having a convex image-side surface, at least one of an object-side and the image-side surfaces of the first lens element being aspheric;
a second lens element with a negative refractive power having a concave image-side surface, at least one of an object-side and the image-side surfaces of the second lens element being aspheric;
a third lens element with a positive refractive power having a concave object-side surface, at least one of the object-side and an image-side surfaces of the third lens element being aspheric; and
a fourth lens element with a negative refractive power having a convex object-side surface, at least one of the object-side and an image-side surfaces of the fourth lens element being aspheric, at least one of the object-side and the image-side surfaces of the fourth lens element being formed with an inflection point;
wherein a focal length of the first lens element is f1, a focal length of the second lens element is f2, a focal length of the third lens element is f3, a focal length of the fourth lens element is f4, and they satisfy the relations:

$1.1615 \leq f1/f3 \leq 1.6339$;

$-3.5 \leq f2/f3 \leq -2.8478$;

$2.813 \leq f2/f4 < 3.5$;

$-0.9122 < f3/f4 < -0.9878$.

2. The optical lens system with a wide field of view as claimed in claim 1, wherein the focal length of the first lens element is f1, the focal length of the second lens element is f2, and they satisfy the relation:

$-0.8 < f1/f2 < -0.4$.

3. The optical lens system with a wide field of view as claimed in claim 1, wherein the focal length of the first lens element is f1, a focal length of the second lens element and the third lens element combined is f23, and they satisfy the relation:

$0.5 < f1/f23 < 1.8$.

4. The optical lens system with a wide field of view as claimed in claim 1, wherein a focal length of the second lens element and the third lens element combined is f23, the focal length of the fourth lens element is f4, and they satisfy the relation:

$-1.7 < f23/f4 < -0.7$.

5. The optical lens system with a wide field of view as claimed in claim 1, wherein a focal length of the first lens element and the second lens element combined is f12, a focal length of the third lens element and the fourth lens element combined is f34, and they satisfy the relation:

$0.1 < f12/f34 < 1.0$.

6. The optical lens system with a wide field of view as claimed in claim 1, wherein a focal length of the optical lens system with a wide field of view is f, a distance from the object-side surface of the first lens element to an image plane along an optical axis is TL, and they satisfy the relation:

$0.5 < f/TL < 0.85$.

* * * * *